United States Patent [19]
Kobayashi et al.

[11] Patent Number: 5,275,009
[45] Date of Patent: Jan. 4, 1994

[54] SENSOR AND CONTROL SYSTEM FOR AN AUTOMOTIVE AIR CONDITIONING SYSTEM

[75] Inventors: Kazumitsu Kobayashi, Isesaki; Masaru Kuribara, Tatebayashi; Toru Takeshita, Isesaki, all of Japan

[73] Assignees: Sanden Corporation; Japan Electronic Control Systems Company, Ltd., both of Japan

[21] Appl. No.: 975,957

[22] Filed: Nov. 13, 1992

Related U.S. Application Data

[62] Division of Ser. No. 789,991, Nov. 12, 1991, Pat. No. 5,197,298.

[51] Int. Cl.⁵ .......................................... G01K 13/00
[52] U.S. Cl. .................................. 62/129; 62/228.3
[58] Field of Search ............... 62/129, 216, 225, 202, 62/126, 228.3

[56] References Cited

U.S. PATENT DOCUMENTS
5,036,697 8/1991 Fujiwara et al. .

FOREIGN PATENT DOCUMENTS
57-41207 3/1982 Japan .

Primary Examiner—William E. Wayner
Attorney, Agent, or Firm—Baker & Botts

[57] ABSTRACT

An air conditioning system including a refrigerant circulation route, a compressor, a condenser, an expansion valve, an evaporator and a pressure sensor for detecting pressure in the circulation route comprises a refrigerant phase detecter provided on the circulation route between the condenser and the evaporator where the refrigerant should be in a liquid phase for detecting whether the refrigerant is in a liquid phase or in a vapor phase and a control for determining whether the compressor is in a locked state in accordance with the signals from the refrigerant phase detecter and the pressure sensor. The air conditioning system can precisely determine and detect both compressor lock up and refrigerant leakage without providing a rotation detecting sensor for the compressor.

1 Claim, 6 Drawing Sheets

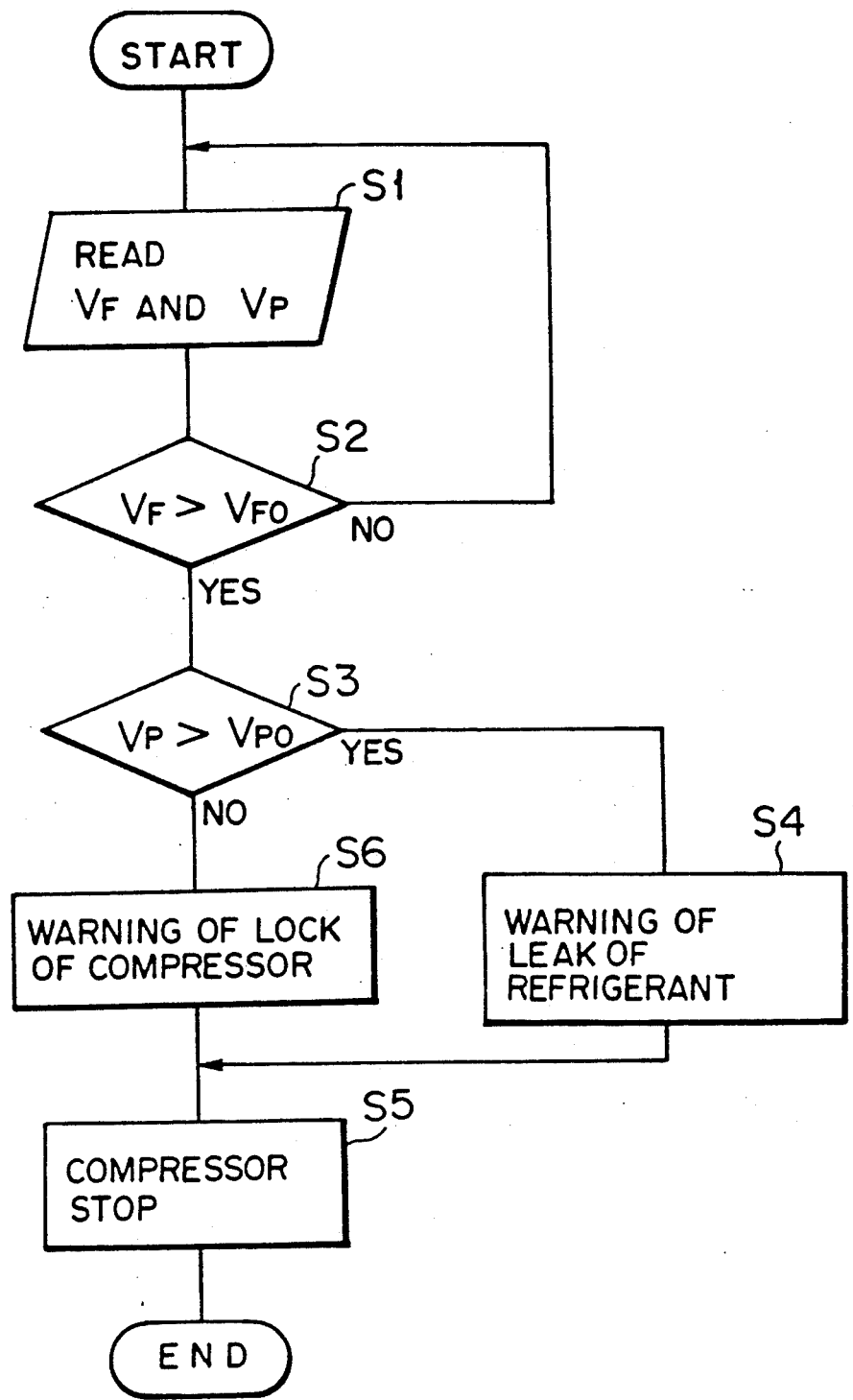

SENSOR AND CONTROL SYSTEM FOR AN AUTOMOTIVE AIR CONDITIONING SYSTEM

This application is a division of application Ser. No. 07/789,991, filed Nov. 12, 1991 now U.S. Pat. No. 5,197,298.

BACKGROUND OF THE INVENTION

1. Field of the Invention

The present invention relates to an air conditioning system, and more particularly to an air conditioning system suitable for use in vehicles.

2. Description of the Prior Art

A typical conventional air conditioning system, for example, a typical conventional air conditioning system for vehicles is constituted, for example, as shown in FIG. 8. A refrigerant such as freon gas is circulated in circulation route 1 formed from pipe 2. Compressor 3, condenser 4, expansion valve 11 and evaporator 5 are provided in circulation route 1 in this order in the circulation direction of the refrigerant which is shown by arrow "A". The endothermic surface of evaporator 5 is exposed to the interior of the vehicle (not shown). After the refrigerant is compressed by compressor 3, the refrigerant is transformed in phase from a high-pressure gas to a high-pressure liquid in condenser 4 and further to a low-pressure gas as it passes through expansion valve 11 and evaporator 5. When the refrigerant is transformed from liquid phase to gaseous phase (vapor phase) by evaporator 5, the refrigerant absorbs heat from the interior of the vehicle and the vehicle interior is cooled. Expansion valve 11 is provided between condenser 4 and evaporator 5. Expansion valve 11 reduces the pressure of the refrigerant to a relatively low pressure so that the liquefied high-pressure refrigerant can be easily vaporized when it passes through evaporator 5.

Compressor 3 is driven by engine 6 of the vehicle via pulley 6A, V belt 8 and pulley 7A attached to electromagnetic clutch 7. Electromagnetic clutch 7 controls the drive of compressor 3. Electromagnetic clutch 7 is initially controlled by an air conditioner switch (not shown). When the air conditioner switch is turned "on", electromagnetic clutch 7 is actuated and compressor 3 is driven by engine 6.

A receiver tank 9 is provided in circulation route 1 at a position between condenser 4 and evaporator 5. Receiver tank 9 temporarily stores the refrigerant which has been in a liquid phase. On top of receiver tank 9, an inspection hole 9A is provided for observing the liquefaction of the refrigerant. Pressure sensor 10 is attached to receiver tank 9. Pressure sensor 10 detects the pressure of the refrigerant in receiver tank 9. When the pressure in receiver tank 9 exceeds a predetermined pressure, a signal is sent to a control unit (not shown). The control unit sends an "off" signal to clutch 7 when pressure sensor 10 detects an excessive pressure, and the clutch is released and compressor 3 is stopped. The bursting of pipe 2 or other components can thus be prevented by stopping compressor 3. When the pressure of the refrigerant reduces to another predetermined pressure from the excessive pressure, pressure sensor 10 sends a signal to the control unit. The control unit sends an "on" signal to clutch 7, and compressor 3 is driven again. This on-off operation of compressor 3 in accordance with the detection of the pressure of the refrigerant by pressure sensor 10 is automatically controlled. Damage to pipe 2 or other components and the overheating of compressor 3 can be prevented by this control.

In such a conventional air conditioning system, there are the following problems. For example, in a case where foreign materials intervene between the cylinder and the piston of compressor 3, the compressor may be locked. In such a case, the refrigerant cannot circulate in circulation route 1, and the cooling ability of the system quickly decreases. The driver of the vehicle cannot determine whether the reduction of the cooling ability is caused by the lock up of compressor 3 or by the leakage of the refrigerant. Therefore, in the conventional air conditioning system, a rotation detecting sensor is attached to the outside of compressor 3, and the lock of the compressor is detected by the sensor.

In such a conventional air conditioning system, however, since the size and type of compressor 3 vary depending upon the type of vehicle, it is often necessary to reconstruct the compressor in order to attach the rotation detecting sensor to the outside of the compressor. The working or processing of the reconstruction of the compressor is very time consuming and costly.

Moreover, even if the rotation detecting sensor is attached to the compressor, refrigerant leakage cannot be detected.

SUMMARY OF THE INVENTION

Accordingly, an object of the present invention is to provide an air conditioning system which can determine and detect both of the lock of a compressor and the leakage of refrigerant without providing a rotation detecting sensor for the compressor.

To achieve this object, an air conditioning system according to the present invention is herein provided. The air conditioning system includes a circulation route for circulating a refrigerant, a compressor, a condenser, an expansion valve and an evaporator disposed on the circulation route in this order in the circulation direction of the refrigerant, and a pressure sensor for detecting a pressure in the circulation route. The air conditioning system comprises a refrigerant phase detecting means provided on a path of the circulation route between the condenser and the evaporator where the refrigerant should be in a liquid phase for detecting whether the refrigerant is in a liquid phase or in a vapor phase, and means for determining whether the compressor is in a locked state in accordance with the signals from the refrigerant phase detecting means and the pressure sensor.

In the air conditioning system, the refrigerant phase detecting means detects whether there exists some refrigerant of vapor phase in the refrigerant which should be in liquid phase in the path between the condenser and the evaporator. In addition, the determining means determines whether there are refrigerant leaks and whether the compressor is in a locked state in accordance with the signals from the refrigerant phase detecting means and the pressure sensor. Therefore, both refrigerant leakage and the compressor lock up are determined without using a rotation detecting sensor for the compressor. By this determination, damage to pipes and other components and compressor overheating can be prevented, thus minimizing the amount of repair work necessary. As a result, the reliability and the life of the system can be greatly increased.

BRIEF DESCRIPTION OF THE DRAWINGS

Some preferred exemplary embodiments of the invention will now be described with reference to the accompanying drawings, which are given by way of example only, and are not intended to limit the present invention.

FIG. 6 is a flowchart showing the control in the air conditioning system shown in FIG. 1.

DETAILED DESCRIPTION OF PREFERRED EMBODIMENTS OF THE INVENTION

Figure 1:
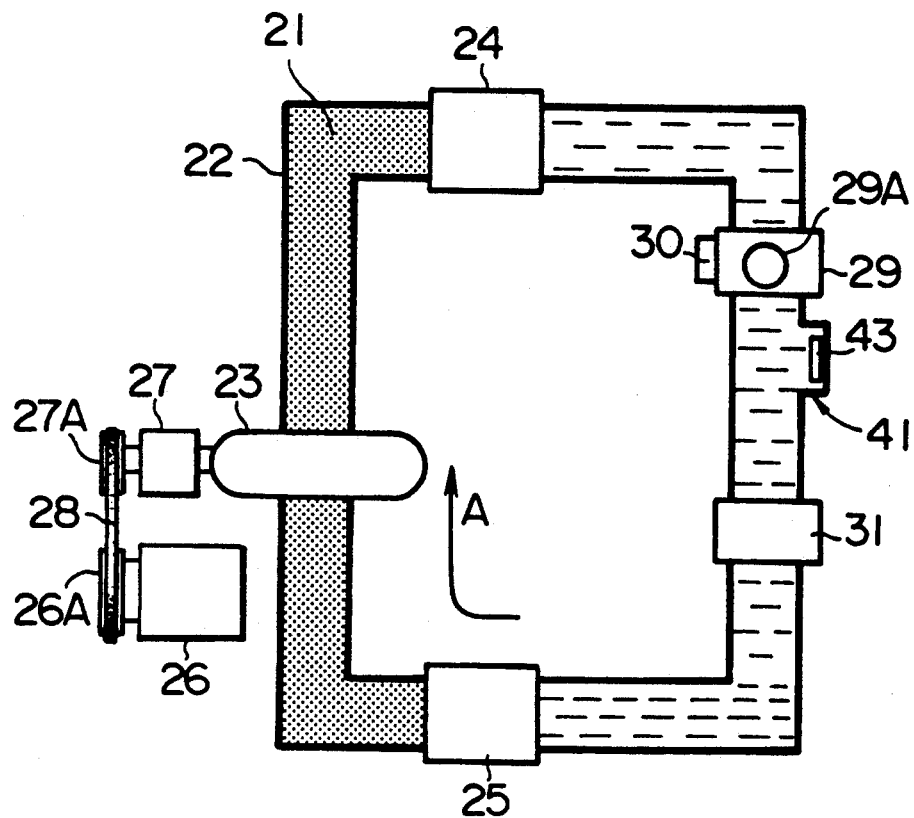
FIG. 1 is a schematic view of an air conditioning system according to a first embodiment of the present invention.

Referring to the drawings, FIGS. 1-6 illustrate an air conditioning system according to a first embodiment of the present invention. In FIG. 1, a refrigerant such as freon gas is circulated in a circulation route 21 formed from a pipe 22. Compressor 23, condenser 24, expansion valve 31 and evaporator 25 are provided on circulation route 21 in this order in the circulation direction of the refrigerant which is shown by arrow "A". The endothermic surface of evaporator 25 is exposed to the interior of the vehicle (not shown). After the refrigerant is compressed by compressor 23, the refrigerant is transformed in phase from a high-pressure gas to a high-pressure liquid in condenser 24 and further to a low-pressure gas in expansion valve 31 and evaporator 25. When the refrigerant is transformed from liquid phase to gaseous phase (vapor phase) by evaporator 25, the refrigerant absorbs heat from the interior of the vehicle and the interior of the vehicle is cooled. Expansion valve 31 is provided between condenser 24 and evaporator 25. Expansion valve 31 reduces the pressure of the refrigerant to a relatively low pressure in order to facilitate vaporization of the liquefied high-pressure refrigerant when it passes through evaporator 25.

Figure 3:
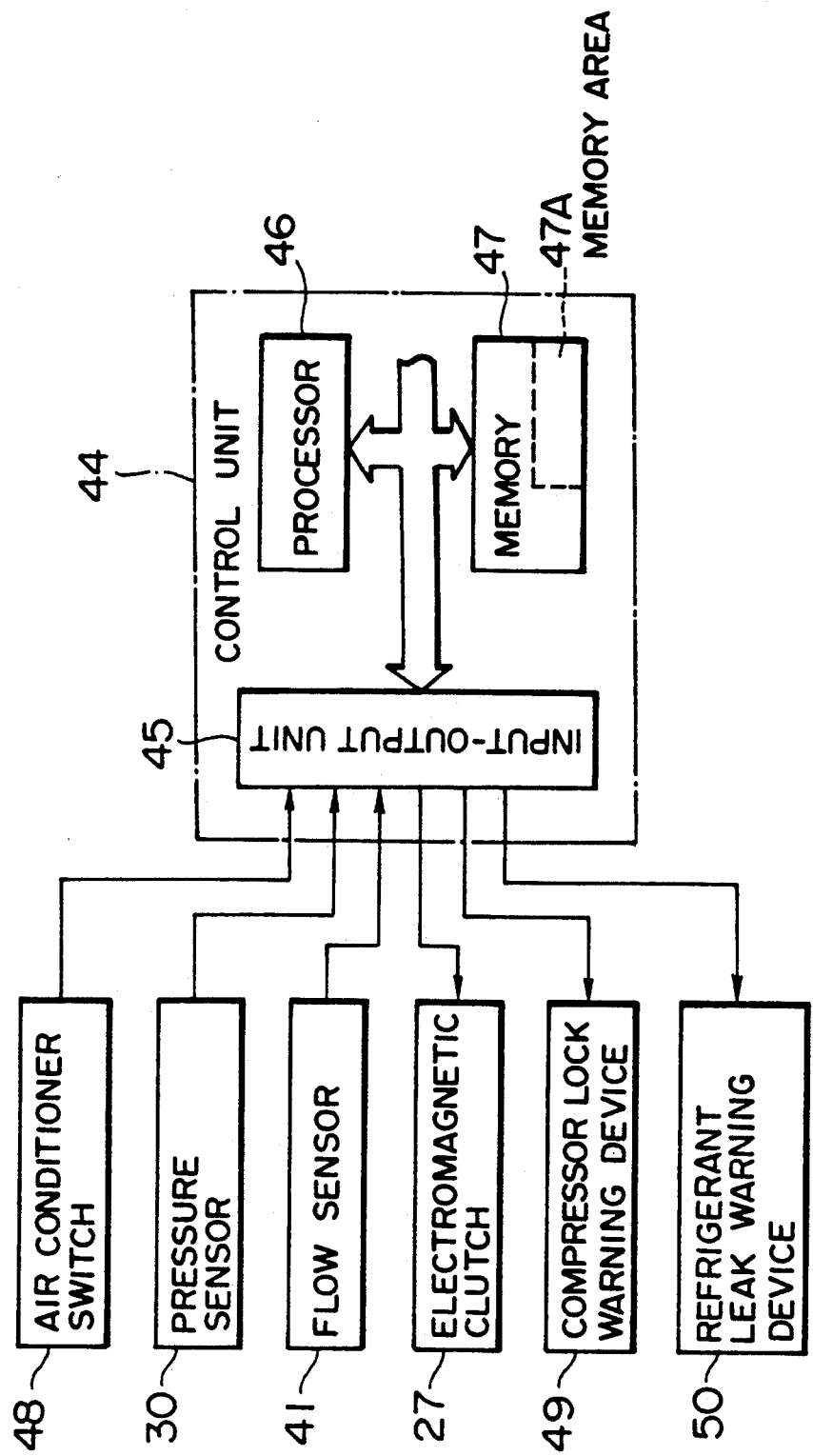
FIG. 3 is a block diagram showing the control system of the air conditioning system shown in FIG. 1.

Compressor 23 is driven by an engine 26 of the vehicle via pulley 26A, V belt 28 and pulley 27A attached to electromagnetic clutch 27. Electromagnetic clutch 27 controls the drive of compressor 23 by controlling the transmission of the driving force of the engine to the compressor. Electromagnetic clutch 7 is initially controlled by an air conditioner switch 48 (FIG. 3). When the air conditioner switch is turned "on", electromagnetic clutch 27 is actuated and compressor 23 is driven by engine 26.

A receiver tank 29 is provided on circulation route 21 at a position between condenser 24 and evaporator 25. Receiver tank 29 temporarily stores the refrigerant which has been in a liquid phase. On top of receiver tank 29, an inspection hole 29A is provided for observing the liquefaction of the refrigerant. Pressure sensor 30 is attached to receiver tank 29. Pressure sensor 30 detects refrigerant pressure in receiver tank 29, and the detected signal is sent to a control unit 44 (FIG. 3).

Figure 2:
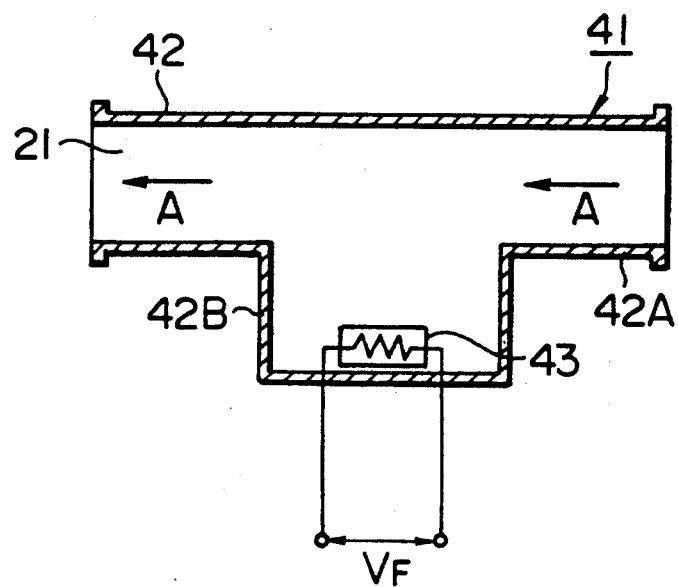
FIG. 2 is an enlarged sectional view of a flow sensor of the air conditioning system shown in FIG. 1.

Flow sensor 41 is provided as a refrigerant phase detecting means on a path of circulation route 21 between condenser 24 and evaporator 25 where the refrigerant should be in a liquid phase, which, in this embodiment, is at a position downstream of receiver tank 29. Casing 42 of flow sensor 41 has a cylindrical portion 42A and a refrigerant stagnation portion 42B formed to project downward, as shown in FIG. 2. The ends of the cylindrical portion 42A are connected to pipe 22, and the portion forms a part of circulation route 21. The refrigerant stagnation portion 42B provides a section of stagnant flow in the refrigerant flowing the portion 42A in the direction shown by arrows "A". Stagnation portion 42B temporarily stores refrigerant therein.

Thermistor 43, a self-exothermic type temperature detecting thermistor, is provided in refrigerant stagnation portion 42B at a position near the bottom. Thermistor 43 is heated to a predetermined temperature by the current supplied from a battery provided as a power source (not shown). The heated thermistor 43 is cooled by the refrigerant in stagnation portion 42B. The degree of the cooling of the heated thermistor 43 changes depending on the phase state of the refrigerant, namely, on whether the refrigerant is in a liquid phase or a vapor phase. The variation in the temperature due to the self-exothermic operation of thermistor 43 is detected as the variation of a voltage signal "$V_F$". Although self-exothermic type thermistor 43 is used in this embodiment, another element, for example, a self-exothermic type Posistor (a kind of a self-exothermic type thermistor) may be used.

FIG. 3 illustrates the control system of the air conditioning system. Control unit 44 is constructed from a microcomputer, and comprises input-output unit 45, processor 46 and memory 47, as shown in FIG. 3. Air conditioner switch 48, pressure sensor 30 and flow sensor 41 are connected to the input side of input-output unit 45, and clutch 27, compressor lock warning device 49 and refrigerant leak warning device 50 are connected to the output side of the input-output unit. These warning devices 49 and 50 are constructed from, for example, a lamp, a buzzer or a speech synthesis device provided on the dash board of the vehicle (not shown). Memory 47 includes ROMs (read only memory) and RAMs (random access memory) and has a memory area 47A. A predetermined value (voltage) "$V_{F0}$" to be compared with the signal "$V_F$" from flow sensor 41 and a predetermined value (voltage) "$V_{P0}$" to be compared with the signal "$V_P$" from pressure sensor 30 are stored in memory area 47A. A program such as shown in FIG. 6, is stored in memory 47 and determines whether the refrigerant is in a liquid phase or in a vapor phase and whether compressor 23 is locked by comparing the signals from flow sensor 41 and pressure sensor 30 with the above predetermined values.

Figure 4A:
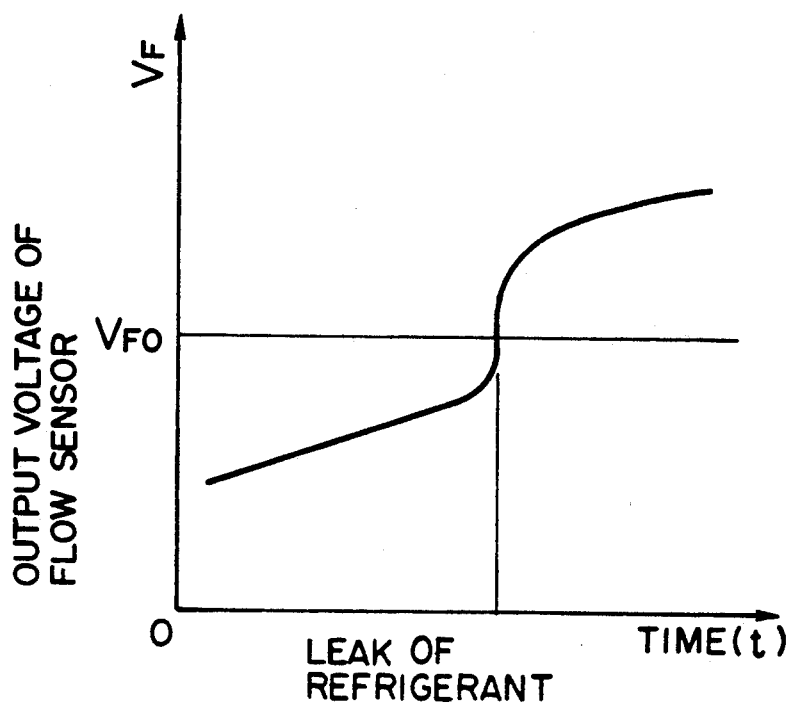
FIG. 4A is a graph showing the characteristic of the output signal of the flow sensor when a refrigerant leak is present in the air conditioning system shown in FIG. 1.
Figure 4B:
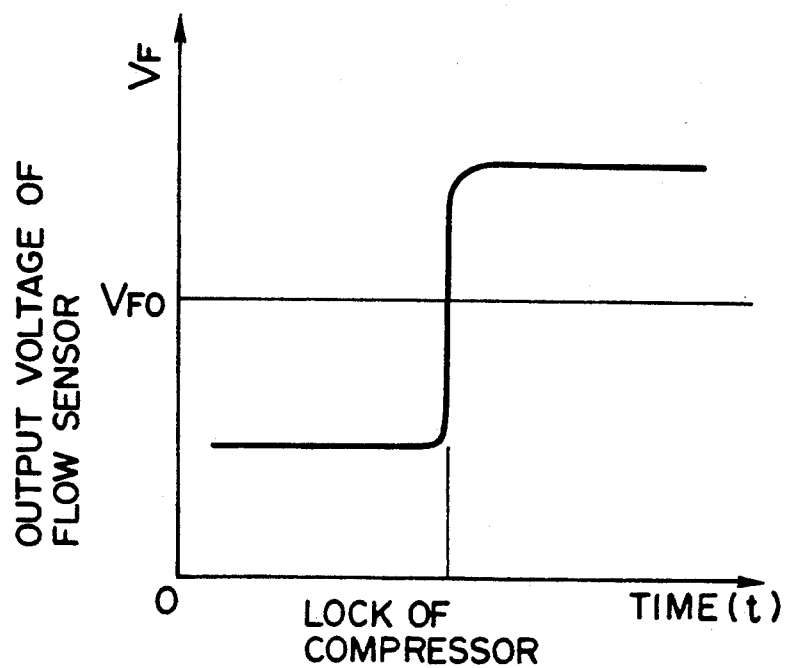
FIG. 4B is a graph showing the characteristic of the output signal of the flow sensor when a compressor is locked in the air conditioning system shown in FIG. 1.
Figure 5A:
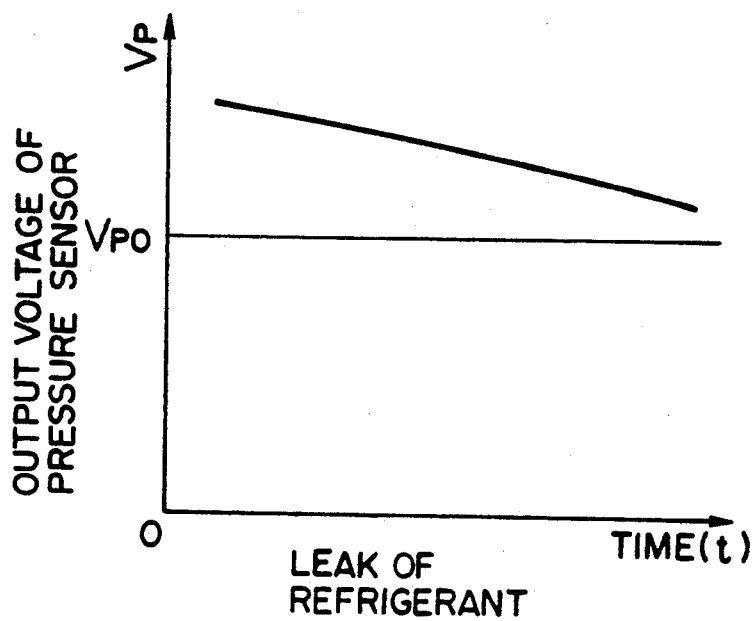
FIG. 5A is a graph showing the characteristic of the output signal of a pressure sensor when a refrigerant leak is present in the air conditioning system shown in FIG. 1.
Figure 5B:
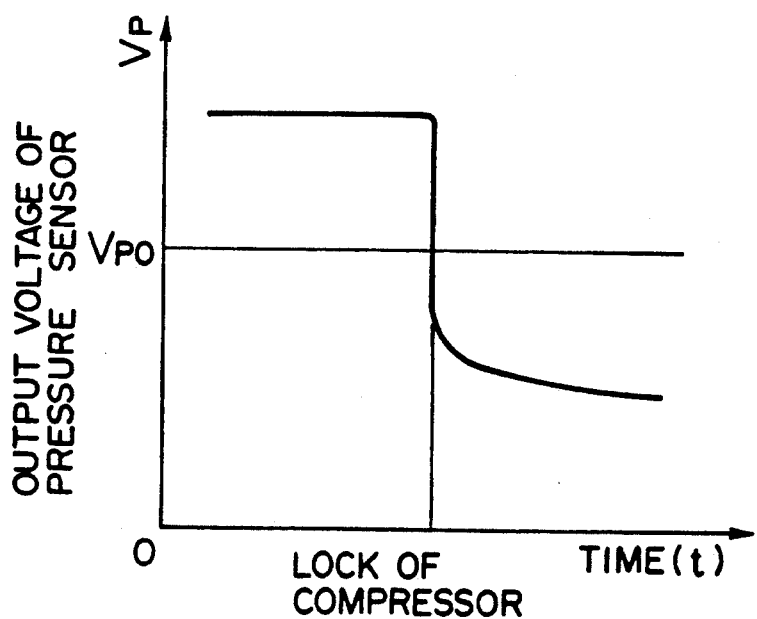
FIG. 5B is a graph showing the characteristic of the output signal of a pressure sensor when a compressor is locked in the air conditioning system shown in FIG. 1.

FIGS. 4A and 4B show the characteristics of the output voltages (resistance values) Of thermistor 43 which functions as the sensing portion of flow sensor 41. When refrigerant leaks, the output voltage "$V_F$" changes as shown in FIG. 4A. When compressor 23 is locked, the output voltage "$V_F$" changes as shown in FIG. 4B. FIGS. 5A and 5B show the characteristics of the output voltages of pressure sensor 30. When the refrigerant leaks, the output voltage "$V_P$" changes as shown in FIG. 5A. When compressor 23 is locked, the output voltage "$V_P$" changes as shown in FIG. 5B. According to these characteristics, variations of the output voltage "$V_F$" of flow sensor 41 and the output voltage "$V_P$" of pressure sensor 30 differ from each other when the refrigerant leaks and when compressor 23 is locked. Particularly, when compressor 23 is locked, because the operation of the compressor is stopped, the output voltage "$V_F$" of flow sensor 41 and the output voltage "$V_P$" of pressure sensor 30 rapidly change as shown in FIGS. 4B and 5B. When the refrigerant leaks, however from the system, because the refrigerant gradually leaks in spite of the continuous operation of compressor 23, the output voltage "$V_P$" of pressure sensor 30 gradually changes as shown in FIG. 5A.

In the above system, when air conditioner switch 48 is turned "on", clutch 27 is closed, the driving force of engine 26 is transmitted to compressor 23 via the clutch, and the compressor is driven. At the same time when the air conditioning system is started, the control shown in FIG. 6 is also started.

In FIG. 6, after the control is started, the output voltage "$V_F$" of flow sensor 41 and the output voltage "$V_P$" of pressure sensor 30 are read at step S1. At step S2, it is determined whether the output voltage "$V_F$" of flow sensor 41 is greater than the predetermined voltage "$V_{F0}$" which has been stored in memory area 47A of memory 47 and at the condition of which the refrigerant transforms from liquid phase to vapor phase. If the output voltage "$V_F$" is determined to be greater than the voltage "$V_{F0}$", the refrigerant which should be in a liquid phase is determined to be in a vapor phase, and the flow proceeds to step S3. If the output voltage "$V_F$" is determined not to be greater than the voltage "$V_{F0}$", the refrigerant is determined to be in a liquid phase, and the flow returns to step S1. In this condition, the operation of compressor 23 is continued.

At step S3, it is determined whether the voltage "$V_P$" pressure sensor 30 read at step S1 is greater than the predetermined voltage "$V_{P0}$" which has been stored in memory area 47A of memory 47. If the output voltage "$V_P$", it is determined to be greater than the voltage "$V_{P0}$", it is determined that compressor 23 is not locked, and the flow proceeds to step S4. If the output voltage "$V_P$" is determined not to be greater than the voltage "$V_{P0}$", the flow proceeds to step S6.

At step S4, since the output voltage "$V_F$" of flow sensor 41 is determined to be greater than the predetermined voltage "$V_{F0}$" at step S2 and the output voltage "$V_P$" of pressure sensor 30 is determined to be greater than the predetermined voltage "$V_{P0}$" at step S3, it can be determined that there is a refrigerant leak, and a warning signal is issued. The warning is given to the driver of the vehicle by warning device 50. Then, the flow proceeds to step S5. At step S5, clutch 27 is released, compressor 23 and engine 26 are disconnected and the operation of the compressor is stopped.

At step S6, since the output voltage "$V_F$" of flow sensor 41 is determined to be greater than the predetermined voltage "$V_{F0}$" at step S2 and the output voltage "$V_P$" of pressure sensor 30 is determined not to be greater than the predetermined voltage "$V_{P0}$" at step S3, it can be determined that compressor 23 is in a locked state, and a warning signal is issued. The warning is given to the driver of the vehicle by warning device 49. Then, the flow proceeds to step S5. As described above, the operation of compressor 23 is stopped by the release of clutch 27 at step S5.

In the above flow, step S2 and step S3 constitute means for determining whether compressor 23 is in a locked state in accordance with the signals from the refrigerant phase detecting means (flow sensor 41) and pressure sensor 30.

Thus, in this system, whether there exists a refrigerant of a vapor phase in the refrigerant which should be in a liquid phase is determined by the signal from flow sensor 41 as well as whether compressor 23 is in a locked state or whether there is a refrigerant leak is determined by the variation of the pressure of the refrigerant detected by pressure sensor 30. Compressor lock warning device 49 and refrigerant leak warning device 50 can properly operate, and the driver can know the precise reason why the cooling ability reduces. Since the service technician can quickly and precisely recognize the reason from the warnings, the air conditioning system can be quickly and easily repaired. Moreover, since compressor 23 is immediately stopped when any of warning signals is issued, further damage such as compressor seizure, can be prevented. As a result, the life of compressor 23 is effectively extended and the reliability of the air conditioning system is greatly increased. Furthermore, since it is not necessary to provide a rotation detecting sensor to the outside of the compressor, the present system can be easily installed or retrofitted to any type of compressors or vehicles.

Figure 7:
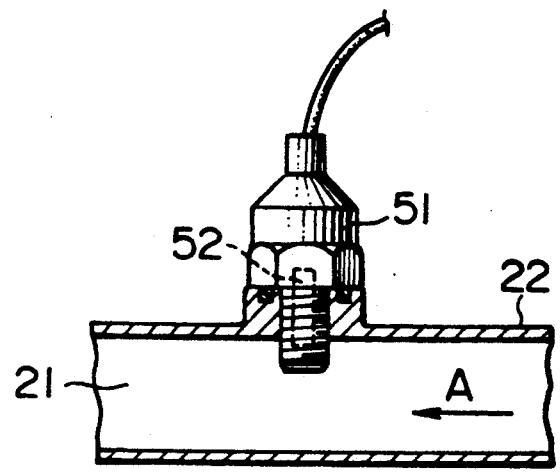
FIG. 7 is a vertical sectional view of a flow sensor of an air conditioning system according to a second embodiment of the present invention.
Figure 8:
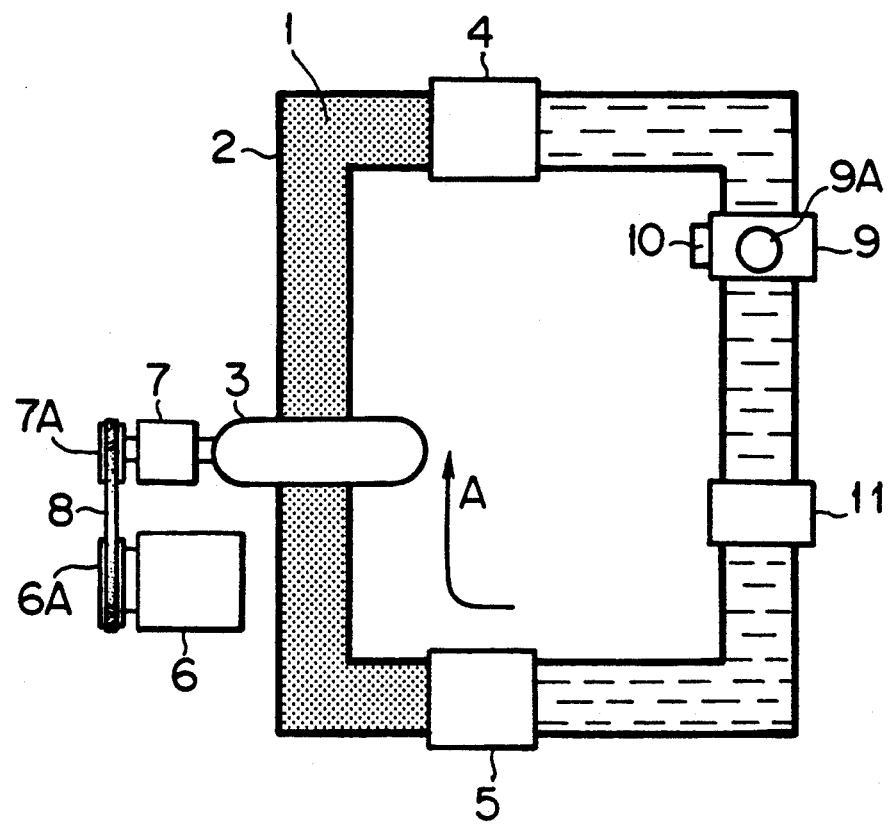
FIG. 8 is a schematic view of a prior art air conditioning system.

Although self-exothermic type thermistor 43 is provided in refrigerant stagnation portion 42B, other structures can be employed. For example, FIG. 7 illustrates the attachment structure of a flow sensor 51 according to a second embodiment of the present invention. Flow sensor 51 is constructed as a plug type sensor, and attached directly to the wall of pipe 22 forming refrigerant circulation route 21. A self-exothermic type thermistor 52 is installed in sensor 51. This flow sensor 51 may be attached to receiver tank 29.

The type of the flow sensor also is not particularly restricted. For example, a capacitance type flow sensor or a resistance type flow sensor may be employed.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of the invention as defined by the following claims.

What is claimed is:

1. A system for discriminating between types of malfunctions within a refrigerant circuit in an air conditioning system comprising:
    container means, coupled to said refrigerant circuit, for receiving at least a portion of a refrigerant from said refrigerant circuit, flow stagnating means, coupled to said container means, for providing a portion of said container means with a stagnant flow of the refrigerant, temperature sensing means, coupled to said container means, for sensing a temperature of the stagnant flow of refrigerant and outputting a temperature signal, first comparator means, coupled to said temperature sensing means, for comparing the temperature signal with a first predetermined value, pressure sensing means, coupled to said refrigerant circuit, for detecting a pressure in said refrigerant circuit and outputting a pressure signal, second comparator means, coupled to said pressure sensing means, for comparing the pressure signal with a second predetermined value, wherein one type of malfunction exists if the temperature signal exceeds the first predetermined value and the pressure signal is less than the second predetermined value, and another type of malfunction exists if the temperature signal exceeds the first predetermined value and the pressure signal exceeds the second predetermined value.

* * * * *